United States Patent
Zhao et al.

(10) Patent No.: US 9,948,175 B2
(45) Date of Patent: Apr. 17, 2018

(54) SOFT-START CONTROL SYSTEM AND METHOD FOR AN ISOLATED DC-DC CONVERTER WITH SECONDARY CONTROLLER

(75) Inventors: Tianting Zhao, Beijing (CN); Yunmei Li, Beijing (CN); Baoxing Chen, Westford, MA (US)

(73) Assignee: Analog Devices, Inc., Norwood, MA (US)

( * ) Notice: Subject to any disclaimer, the term of this patent is extended or adjusted under 35 U.S.C. 154(b) by 189 days.

(21) Appl. No.: 13/101,559

(22) Filed: May 5, 2011

(65) Prior Publication Data

US 2012/0099345 A1 Apr. 26, 2012

Related U.S. Application Data

(60) Provisional application No. 61/406,499, filed on Oct. 25, 2010.

(51) Int. Cl.
*H02M 3/335* (2006.01)
*H02M 1/36* (2007.01)
*H02M 3/338* (2006.01)

(52) U.S. Cl.
CPC .............. *H02M 1/36* (2013.01); *H02M 3/335* (2013.01); *H02M 3/33523* (2013.01); *H02M 3/33592* (2013.01); *H02M 3/3382* (2013.01)

(58) Field of Classification Search
CPC ................................. H02M 1/36; H02M 3/335
USPC .......... 363/21.05, 97, 21, 41, 25, 26, 16, 20, 363/21.12, 21.09, 21.03, 21.01, 21.13, 363/21.07, 21.15
See application file for complete search history.

(56) References Cited

U.S. PATENT DOCUMENTS

| | | | | |
|---|---|---|---|---|
| 4,709,315 A | * | 11/1987 | Ramos | ............................ 363/21 |
| 4,755,922 A | | 7/1988 | Puvogel | |
| 5,099,202 A | * | 3/1992 | Claydon | ................. H02M 1/38 |
| | | | | 327/237 |
| 5,982,645 A | | 11/1999 | Levran et al. | |
| 6,301,135 B1 | * | 10/2001 | Mammano | ........ H02M 3/33523 |
| | | | | 363/132 |
| 7,345,896 B2 | * | 3/2008 | Dalal | ......................... 363/21.14 |
| 7,663,896 B2 | | 2/2010 | Na | |
| 2006/0023476 A1 | | 2/2006 | Fosler | |
| 2007/0153554 A1 | * | 7/2007 | Matsumoto | ..................... 363/16 |

(Continued)

OTHER PUBLICATIONS

International Search Report and Written Opinion dated Feb. 21, 2012, from counterpart international application No. PCT/US2011/057451.

*Primary Examiner* — Jue Zhang
*Assistant Examiner* — Trinh Q Dang
(74) *Attorney, Agent, or Firm* — Wolf, Greenfield & Sacks, P.C.

(57) ABSTRACT

A DC-DC converter for supplying a gradually increasing voltage via a soft start circuit from a first powered domain to a second unpowered domain. The powered domain may be connected to a primary winding of a first transformer, and the unpowered domain may be connected to the secondary winding of the first transformer. The unpowered domain may respond to an applied voltage from the soft start circuit by supplying a feedback signal to the powered domain via a feedback circuit. The feedback signal indicates the power supplied from the secondary winding of the first transformer to the unpowered domain is satisfactory.

37 Claims, 4 Drawing Sheets

(56) References Cited

U.S. PATENT DOCUMENTS

| | | | |
|---|---|---|---|
| 2008/0181316 A1 | 7/2008 | Crawley et al. | |
| 2008/0246450 A1* | 10/2008 | Matyas et al. | 323/238 |
| 2009/0009144 A1* | 1/2009 | Hoshikawa | G03B 15/05 320/166 |
| 2009/0021968 A1* | 1/2009 | Komatsu et al. | 363/126 |
| 2009/0066265 A1* | 3/2009 | Imanaka | H05B 41/2806 315/307 |
| 2009/0179491 A1* | 7/2009 | Ferguson et al. | 307/31 |
| 2010/0157629 A1* | 6/2010 | Yoshikawa | 363/21.01 |
| 2010/0157631 A1* | 6/2010 | Lim et al. | 363/41 |

* cited by examiner

100

200

SOFT-START CONTROL SYSTEM AND METHOD FOR AN ISOLATED DC-DC CONVERTER WITH SECONDARY CONTROLLER

PRIORITY

This application claims priority to provisional U.S. Patent Application Ser. No. 61/406,499 filed on Oct. 25, 2010, the content of which is incorporated herein in its entirety.

BACKGROUND

Isolated DC-DC converters include power transfer circuitry to power an otherwise unpowered voltage domain from a powered voltage domain. The power transfer typically occurs across an isolation barrier. The converter includes a pair of electrically-isolated voltage domains, one of which is powered. The powered voltage domain may transfer power to an otherwise unpowered voltage domain so as to drive circuitry in the unpowered voltage domain.

DC-DC converters commonly begin operation at a nominal voltage in the unpowered voltage domain that must build to a voltage level that allows for proper operation of the DC-DC converter. However, when the converter is initially started, the circuit components of the converter experience a large in-rush of current. The in-rush current delays proper operation of the DC-DC converter because the converter circuit components are delayed from properly operating until the ringing resulting from the large in-rush current subsides.

There is a need for a system and method to reduce the in-rush current and allow for a more gradual transition between starting operation and continued operation of the DC-DC converter.

DETAILED DESCRIPTION

An isolated DC-DC converter is provided that may control the start up voltage to smoothly transfer power from a powered voltage domain to an unpowered voltage domain via a first transformer. The smooth transfer of power is controlled by a feedback control signal that may be transferred across the isolation barrier via a second transformer from the unpowered domain to the powered domain. The feedback signal may indicate whether a voltage induced in the unpowered domain is within proper operating limits. The powered domain may include control circuits that, responsive to the feedback signal, may alter drive signals applied to the first transformer to correct any abnormalities in the voltage induced in the unpowered domain.

A method for soft starting a DC-DC converter is provided. The method may include outputting a soft start signal to cause a power transformer to provide a power supply signal to a DC-DC converter controller. The soft start signal may gradually increase in amplitude. A blocking circuit may compare the power supply signal to a reference signal. Based on the result of the comparison, the blocking circuit may prevent the controller output signal from being applied to a first side of a feedback transformer. When the result of the comparison indicates that the power supply signal is within a certain threshold of the reference signal, the blocking circuit may output a signal indicating that the power supply signal is within the threshold of the reference signal. In response, a controller may apply its output signal to a first side of the feedback transformer. A second side of the feedback transformer may output a signal that may be detected by an activity detector circuit. The activity detector circuit may in response output an activity signal that stops the outputting of the soft start signal.

Figure 1:
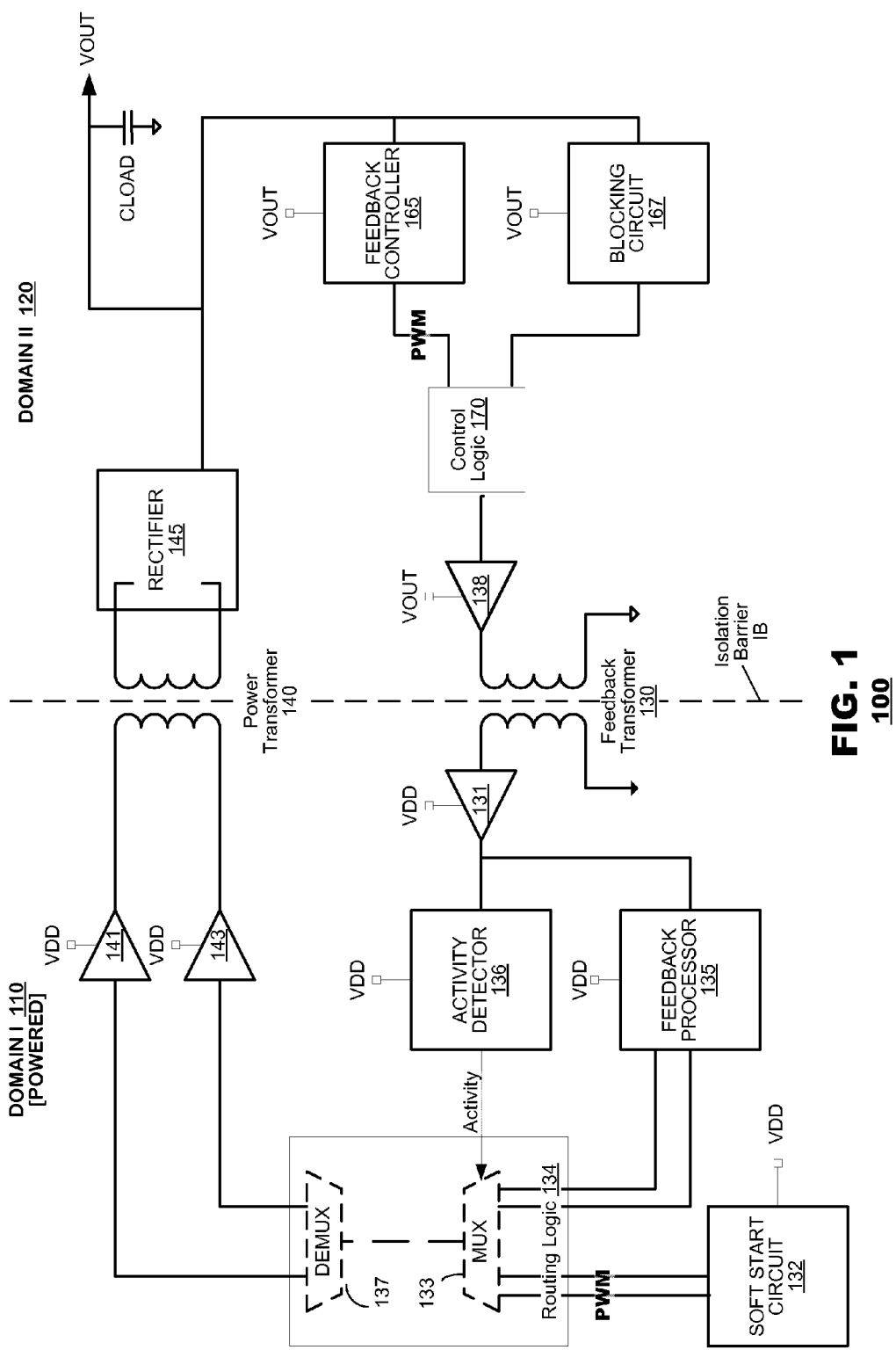
FIG. 1 illustrates a block diagram of a power transfer and control system 100 according to an embodiment of the present invention.

FIG. 1 illustrates a block diagram of a power transfer and control system 100 according to an embodiment of the present invention. The system 100 may include a pair of voltage domains 110, 120 each domain electrically isolated from the other. The system may include a feedback transformer 130 and a power transformer 140 that bridge an isolation barrier IB provided between the two domains 110, 120.

As illustrated, circuits in the first domain 110 may be powered by a locally provided power source, shown as VDD. The second domain 120 may be unpowered except for power delivered to it from the first domain 110 via the power transformer 140. Circuits in the second domain may be powered by the energy delivered via the power transformer 140. The second domain, once powered, may also supply power to a load device C$_{LOAD}$. A feedback transformer 130 with a primary winding in the unpowered second domain 120 may pass a signal via a secondary winding in the first powered domain 110.

The system 100 also may include various circuits to control power exchange between the two domains 110 and 120. In the powered domain 110, the control circuits may include a soft start circuit 132, routing logic 134, driving amplifiers 141, 143, a feedback processor 135, a receiver 131 and an activity detector 136. Control circuits in the unpowered domain 120 may include a feedback controller 165, a blocking circuit 167, control logic 170, and a driver 138.

In the powered domain 110, a soft start circuit 132 may output a gradually increasing duty signal to start powering the second, unpowered voltage domain 120. The soft start circuit 132 of the system 100 may generate a pulse width modulated (PWM) signal based on a signal (i.e. periodic, aperiodic, increasing amplitude and/or frequency) and a reference voltage signal, for example, a sawtooth waveform and a ramping reference voltage. As a result, the PWM signal may gradually increase in amplitude based on the ramping reference voltage, thereby providing a graceful transition of power to the unpowered domain. The PWM signal may be output by the soft start circuit 132 to the routing logic 134. The routing logic 134, responsive to a control signal input from the activity detector 136, may route signals from one of the feedback processor 135, or the soft start circuit 132 to the power transformer 140. The routing logic 134 may operate in response to the signal received from the soft start circuit 132 to provide a signal suitable for transformation by the power transformer 140. The routing logic 134 may include multiplexer 133 and demultiplexer 137. The multiplexer 133 and demultiplexer 137 of routing logic 134, in response to a control signal, may operate to provide a signal of appropriate frequency and magnitude to driving amplifiers 141 and 143. The driving amplifiers 141, 143 may provide an amplified signal for driving the power transformer 140. In fly back or forward converter configurations, a single switch and driver may be suitable. In these and some other cases, a single driving amplifier may be utilized when a single switch is used to supply a power signal to the power transformer. In such configurations, routing logic 134 may not need multiplexer 133 and/or demultiplexer 137.

The power transformer 140 may transform the amplified signal from the first, powered domain 110 as an output to the second, unpowered domain 120. In response to the alternating drive signals, the power transformer 140 may provide a transformed output signal to the rectifier 145. The transformed power supply signal may be rectified by rectifier 145 to a DC signal $V_{OUT}$. The rectifier 145 may rectify the signal output from the power transformer 140, and may output an output signal $V_{OUT}$. The $V_{OUT}$ may be output from the converter 100, and may be applied to the feedback controller 165 and to the blocking circuit 167. The feedback controller 165 may generate a feedback signal based on the output voltage $V_{OUT}$ signal. For example, the feedback signal may be a pulse width modulated (PWM) signal representing a magnitude of $V_{OUT}$. The output $V_{OUT}$ signal may also be used as a supply voltage for various circuits such as driver 138, feedback controller 165 and blocking circuit 167.

The feedback controller 165 may receive the output DC signal $V_{OUT}$, and may compare the signal $V_{OUT}$ to a reference signal (not shown). Based on the results of the comparison, the feedback controller 165 may output an output signal, such as a pulse width modulated (PWM) signal, to the control logic 170. The feedback controller 165 may be, for example, a type III controller. The blocking circuit 167 may also monitor the output DC signal $V_{OUT}$ by comparing $V_{OUT}$ to a reference signal, and output a signal based on the comparison. The blocking circuit 167 may output a signal indicating to the control logic 170 to allow the signal generated by the feedback controller 165 to be applied to the driver 138 when, for example, the power supply voltage (i.e. $V_{OUT}$) is within a threshold of a reference voltage to which $V_{OUT}$ is compared.

The control logic 170 may, for example, receive both the PWM signal output by the feedback controller 165 and the signal output from the blocking circuit 167. Based on the output from the blocking circuit 167, the control logic 170 may either allow or prevent the signal generated by the feedback controller 165 to be applied to the driver 138. The control logic 170 may pass the feedback signal from the feedback controller 165 based on the blocking control signal received from the blocking circuit 167. The driver 138 may supply a drive signal to the feedback transformer 130. The feedback transformer 130 may transform the drive signal from the driver 138.

The signal generated by the feedback transformer 130 may be applied across the isolation barrier 113 to the powered domain to receiver 131. The receiver 131 may amplify the transformed signal, and apply it to the activity detector 136 and feedback processor 135.

The activity detector 136 may compare the signal received from receiver 131 to a reference voltage (that may be different from or have a magnitude substantially the same as the reference voltage used by blocking circuit 167). If the results of the comparison indicate that the voltage VOUT in the unpowered domain is not sufficient (e.g. the voltage is not at a high enough magnitude), the activity detector 136 may output an activity control signal indicating the result to the routing logic 134. Based on the activity control signal from the activity detector 136, the routing logic 134 may prevent the activity control signal from the activity detector 136, the PWM signal from the soft start circuit 132 from being passed out of the routing logic 134. For example, in response to the activity control signal received from the activity detector 136, the routing logic 134 may stop processing the signal received from the soft start module 132, and begin passing and processing the signal received from the feedback processor 135.

The routing logic 134 may continue to output the signal from the soft start circuit 132 until the activity detector 136 indicates the signal from the feedback transformer 130 is to be used in place of the soft start circuit 132.

The feedback processor 135 may generate control signals for driving amplifiers 141 and 143 of the power transformer 140 in response to feedback signals received from the feedback transformer 130. The signal from the feedback processor 135 may be any type of or any form of signal, for example, a PWM signal. In the illustrated configuration, feedback processor 135 may generate two signals, one for each driving amplifier 141 and 143. Various implementations may be envisioned. An exemplary circuit configuration will be discussed in more detail with reference to FIG. 2.

Figure 2:
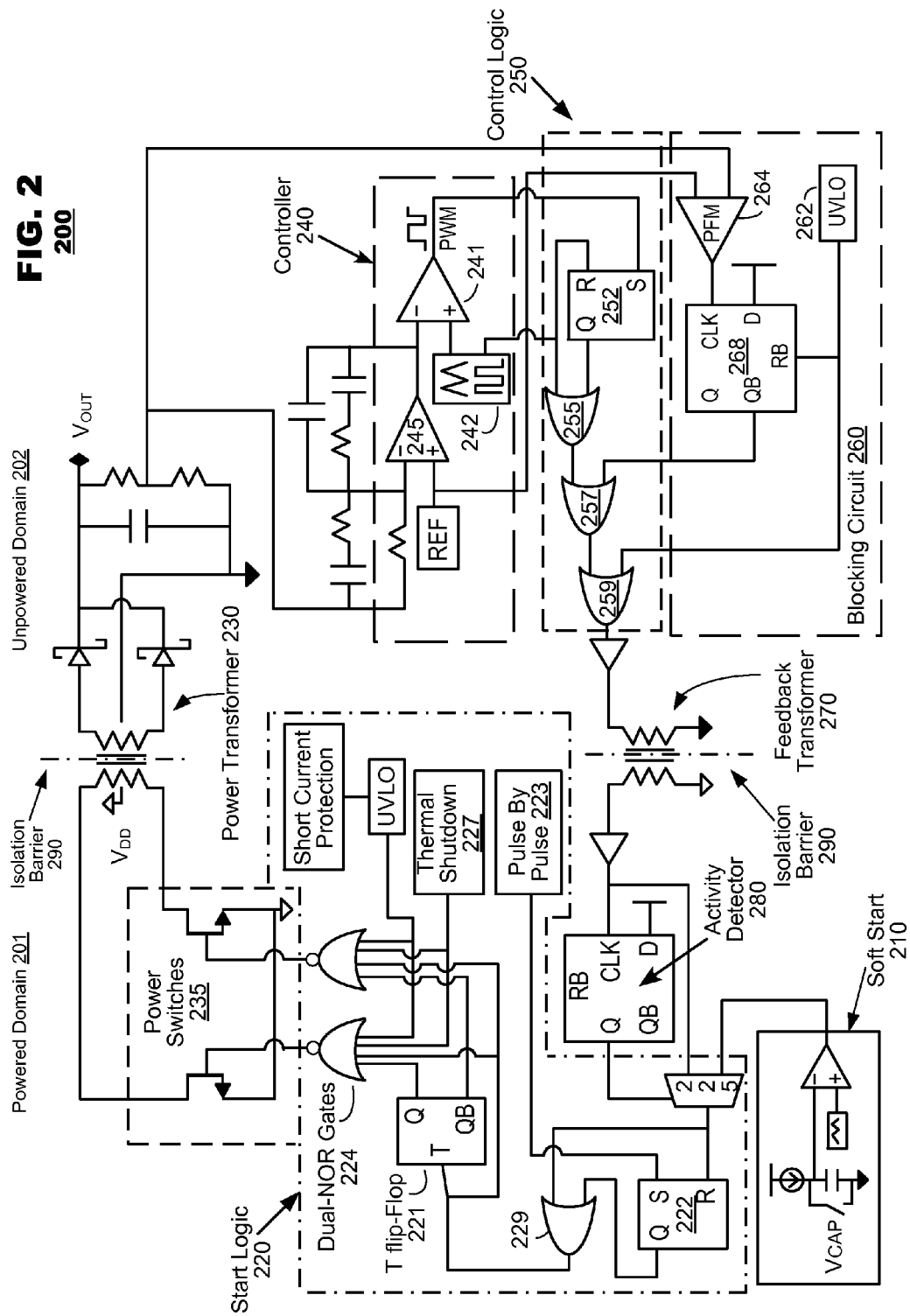
FIG. 2 illustrates an exemplary schematic diagram of an isolated DC-DC converter according to an embodiment of the present invention.

FIG. 2 illustrates an exemplary schematic diagram of an isolated DC-DC converter according to an embodiment of the present invention. The isolated DC-DC converter 200 may have a powered domain 201 and unpowered domain 202. The powered domain 201 and the unpowered domain 202 may be separated by an isolation barrier 290. The isolation barrier may be bridged by a power transformer 230 and feedback transformer 270. The power transformer 230 may provide power across the isolation barrier 290 to the unpowered domain 202, and the feedback transformer 270 may provide feedback signals from the unpowered domain 202 across the isolation barrier 290 to the powered domain 201. The powered domain 201 may include a soft start circuit 210, start logic 220, power switches 235, a power transformer 230 and an activity detector 280. The unpowered domain 202 may include a feedback controller 240, control logic 250, a blocking circuit 260, and a feedback transformer 270. Additional circuit components such as capacitors and resistors may also be included. The activity detector 280 may include logic, for example, a D flip-flop, and may have inputs from the feedback transformer 270, and outputs to the start logic 220.

The soft start circuit 210 may include a current source, a capacitor, an input for a reference waveform, and an amplifier. The start logic 220 may include a multiplexer 225, an S-R flip-flop 222, a NOR gate 229, a T flip-flop 221, circuit protection elements (short circuit protection, undervoltage lock-out (UVLO), thermal shutdown 227, pulse-by-pulse generator 223, and dual-NOR gates 224. The power transformer 230 may have a center-tap power supply connection, and may, for example, be connected to rectifying circuitry to provide a DC output signal.

The controller 240 may be a feedback controller connected to a voltage divider network, and may, for example, have capacitors and other circuit components connected. Controller 240 may be a type III controller. A reference voltage source, a reference waveform source and a clock signal may be connected to the controller 240. These may also be powered via the power transformer 230.

The control logic 250 may, for example, include an S-R flip-flop 252 and cascaded OR gates 255, 257 and 259. Other combinations of flip-flop circuits and logic gates may be used to provide the same or similar functionality as control logic 250.

The blocking circuit 260 may include a comparator 264 for comparing the power transformer output voltage to a reference voltage. The blocking circuit 260 may also be configured with a D flip-flop 268, an undervoltage lockout (UVLO) 262, and outputs to the control logic 250.

The feedback transformer 270 may include inputs from the control logic 250, and may have an output for providing a feedback signal. The feedback transformers 270 may also have an output to the start logic 220 and the activity detector 280.

The exemplary DC-DC converter 200 may operate as described in the following example. At start up of the DC-DC converter 200, an output voltage VOUT may not be present at the output of the power transformer 210, and no signal may be present at the feedback transformer 270. In other words, the powered domain 201 has not begun to provide power to the unpowered domain 202. In response to a control signal, a current source within soft start 210 may begin charging a capacitor, which may have a voltage $V_{CAP}$. By operation of a shorting switch, the capacitor may be periodically discharged, and the capacitor begins recharging causing a varying voltage to be applied to an amplifier. The voltage of the capacitor may be compared, for example, by the amplifier to a reference voltage waveform. Based on the result of the comparison, a output waveform, such as a pulse width modulated (PWM) waveform with a gradually increasing amplitude may be generated, and output from the soft start circuit 210 as a soft start waveform. In addition, the signal from the soft start 210 may be a PWM signal that may be approximately double the frequency needed to generate a suitable output voltage VOUT from the power transformer 230.

The gradually-increasing soft start waveform may be applied to a multiplexor 225 in the start logic 220. The multiplexor 225 may have both a control input and a signal input from the activity detector 280. Based on the present control signal from the activity detector 280 to the multiplexor 225, either the PWM waveform from the soft start circuit 210 or the PWM signal from the feedback transformer may be used.

Specifically, since the output voltage $V_{OUT}$ may not be immediately present at the output, the activity detector 280 may not output a signal to the start logic 220 because an appropriate level of power has not yet been supplied to the unpowered domain 202. In the absence of an activity detector 280 signal, the start logic 220 may only passes the signal received from the soft start circuit 210.

The multiplexor 225 may apply the PWM signal from the soft start 210 to both the reset (R) terminal of the S-R flip-flop 222 and an input of OR gate 229. The pulse-by-pulse circuit 223 may apply a signal to the set (S) terminal of the S-R flip-flop 222. In response, the output (Q) of the S-R flip-flop 222 may be applied to a first terminal of the pulse-by-pulse OR gate 229. The PWM signal from the soft start 210 may be applied to a second terminal of the OR gate 229.

A frequency of the PWM signal from the soft start 210 may not change, the PWM duty may have a pulse on time that can be truncated by operation of the pulse-by-pulse circuit 223, if, for example, a current limit is passed. When the pulse-by-pulse circuit 223 applies a signal to the set (S) terminal of the S-R flip-flop 222, both the Q signal and the soft start 210's PWM signal may be applied to the OR gate 229.

The output of the OR gate 229 may be applied to a T terminal of the T flip-flop 221, and to one of a plurality of inputs to each of the power switch driving dual-NOR gates 224. The T flip-flop 221 may toggle the output states of its outputs Q and QB in response to the signal received from the OR gate 229.

If no protection (e.g., short circuit protection, undervoltage lock-out (UVLO), and thermal shutdown 227) circuit output is activated (i.e. stays OFF), the power switch driving dual-NOR gates 224 may simply respond to the signals from toggled outputs (Q and QB (Q-bar)) of the T flip-flop 221. The protection circuits, short circuit protection, UVLO, thermal shutdown 227 stay on when a fault condition occurs thereby preventing dual-NOR gates 224 from changing states.

The driving signals output from the power switch driving dual-NOR gates 224 may be alternately applied to gate terminals of the power switches 225. The power switches 235 may alternately conduct thereby forming a current path from the center tap voltage applied to the power transformer 230 to ground. With an alternating current path formed, the power transformer 230 may gradually charge to generate an output voltage VOUT. The power switches 235 may have a varying duty cycle of, for example of, approximately 30% on/70% off for a first switch and a duty cycle, for example, of approximately 30% on/70% off with a delay of 50% for a second switch. This allows for a gradual rise in the applied voltage and minimizes in-rush current. Of course, other duty cycles that may provide suitable performance to gradually generate an output voltage in the unpowered domain may also be used.

A rectifying circuit connected to the power transformer 230 rectifies the output AC voltage to a DC voltage (e.g. 3.3 or 5 volts, the power transformer 270 can either maintain the same voltage, step up, or step down the voltage to the unpowered domain 202). Initially, the output DC voltage $V_{OUT}$ may be below the desired output voltage. The output DC voltage $V_{OUT}$ may be applied to circuit components (resistors and capacitors), which may form voltage dividers and/or feedback circuits. The error amplifier may include $V_{OUT}$ clamps to allow the error amplifier output to settle more quickly. A reduced voltage, such as $V_{RAIL}$, may be supplied to the controller 240. The controller 240 may receive the voltage $V_{RAIL}$ as an input to the error amplifier 245 where the $V_{RAIL}$ voltage is compared to a reference voltage. The results of the comparison by error amplifier 245 may be provided to a PWM comparator 241 that may have an alternating input signal (e.g., saw tooth) received from a waveform generator 242. The output of the PWM comparator 241 may be a PWM signal.

The control logic 250 may have an input for the PWM signal from the PWM comparator 241, and an input from a clock signal provided by the waveform generator 242. The PWM signal may be applied to the S terminal of an S-R flip-flop 252. The clock signal from waveform generator 242 may be applied to an R terminal of the S-R flip-flop in the control logic 250, and a first OR gate 255 in the control logic 250. The output terminal (Q) of the S-R flip-flop may be output to a terminal of the first OR gate 255. The output of the first OR gate 255 may be applied to a first input of a second OR gate 257. A second input of the second OR gate 257 may be received from a D flip-flop 268 of the blocking circuit 260. The D flip-flop 268 may have a voltage signal input to its D input and a pulse-frequency modulation (PFM) comparator 264 output connected to a clock (CLK) terminal of the D flip-flop 268.

The inputs to the PFM comparator 264 may be the reference voltage from the controller 240 and the DC voltage $V_{RAIL}$ from, for example, the voltage divider circuit connected to the rectifier of the power transformer 230. Until the DC voltage output VOUT by the power transformer (and the voltage $V_{RAIL}$) is within a predetermined threshold of the reference voltage (i.e., exceeds a PFM threshold), the D flip-flop 268 may apply a signal to the second terminal of second OR gate 257. This prevents the second OR gate 257 from outputting a varying signal. Generally, when the output DC voltage VOUT is within the predetermined threshold of the reference voltage, the D flip-flop 268 allows the blocking circuit 260 to assert the blocking control signal to the second OR gate 257. The second OR gate 257 may have an output connected to a third OR gate 259. The third OR gate 259 may be used to implement a UVLO protection circuit 262. If there is an under voltage condition, UVLO protection circuit 262 may assert a signal to OR gate 259, which prevents the OR gate 259 from changing states. With no signals applied to OR gates 257 and 259 by the blocking circuit 260, or the UVLO protection circuit, a varying signal may be applied to the feedback transformer 270. The feedback transformer 270 may transform the varying signal applied from control logic 250, and output a varying signal on its secondary winding. The varying signal output by the feedback transformer 270 may be applied to the activity detector 280 and the start logic 220 of the powered domain 201.

In the powered domain 201, the activity detector 280 may be implemented using digital logic, for example, a D flip-flop. The D flip-flop may receive the alternating signal at a clock (CLK) terminal. Based on the received alternating signal, an output (Q) of the D flip-flop may supply a control signal to a multiplexer 225 of the start logic 220. The output Q signal may cause multiplexer 225 to select the input from the feedback transformer 270 instead of the input from the soft start circuit 210. This indicates that the power supplied to the unpowered domain 202 is within a threshold of the desired voltage (e.g. substantially 5 volts). As a result, the signal from the soft start 210 is no longer applied, and the voltage in the unpowered domain was permitted to rise gracefully.

The above is an exemplary detailed description of the operation of start logic 220, controller 240, blocking circuit 260, and control logic 250 that may be used to implement an embodiment of the present invention. Other logic may be designed to implement similar operations and functionality by one of ordinary skill in the art.

Figure 3:
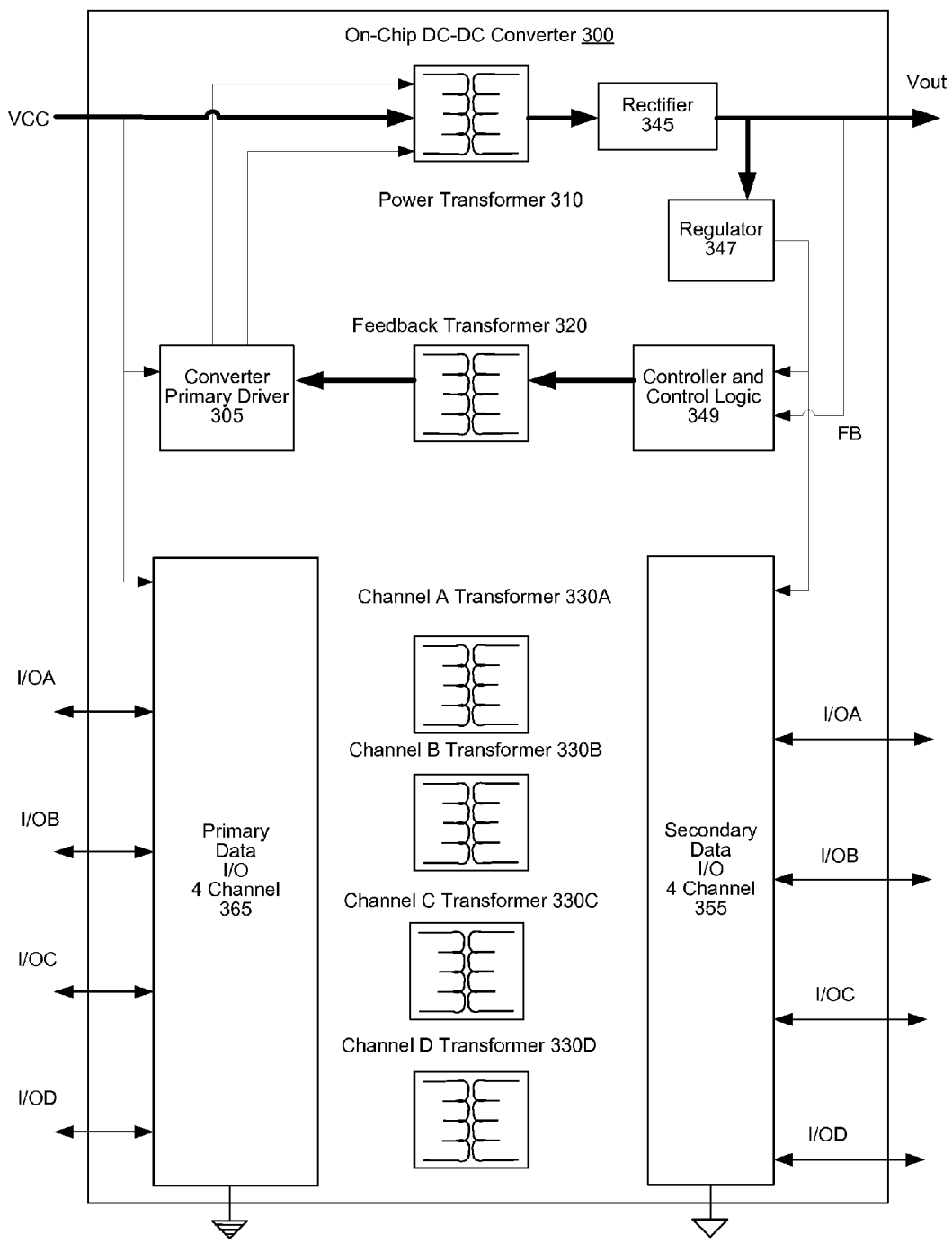
FIG. 3 illustrates an exemplary integrated chip implementation of a DC-DC converter method according to an embodiment.

FIG. 3 illustrates an exemplary integrated chip implementation of a DC-DC converter method according to an embodiment. The on-chip DC-DC converter 300 may include inputs for an input voltage VCC, an output for output voltage VOUT, inputs/outputs (I/OA-I/OD) for data channels A-D. The components of on-chip DC-DC converter 300 may include a power transformer 310, a rectifier 345, a regulator 347, a controller and control logic 349, a feedback transformer 320, secondary data input/output (I/O) 355, channel transformers 330A-330D, primary data I/O 365, and converter primary driver 305. The power supply voltage VCC may be provided to the power transformer 310 and as an input to converter primary driver 305. The on-chip DC-DC converter 300 may operate as explained above with respect to FIGS. 1 and 2. Functions shown in FIGS. 1 and 2 may have been combined in FIG. 3. For example, the converter primary driver 305 of on-chip DC-DC converter 300 may include a soft start circuit, an activity detector, routing logic, and power switches as described with reference to FIGS. 1 and 2. In addition, the regulator 347 may include components (e.g. voltage clamp) that may be formed on chip, and may only supply voltages to the controller and control logic 349. In contrast, the regulation functions may occur within the controller of FIGS. 1 and 2. Other embodiments may include configurations where only portions of the components are formed on a single integrated chip.

Figure 4:
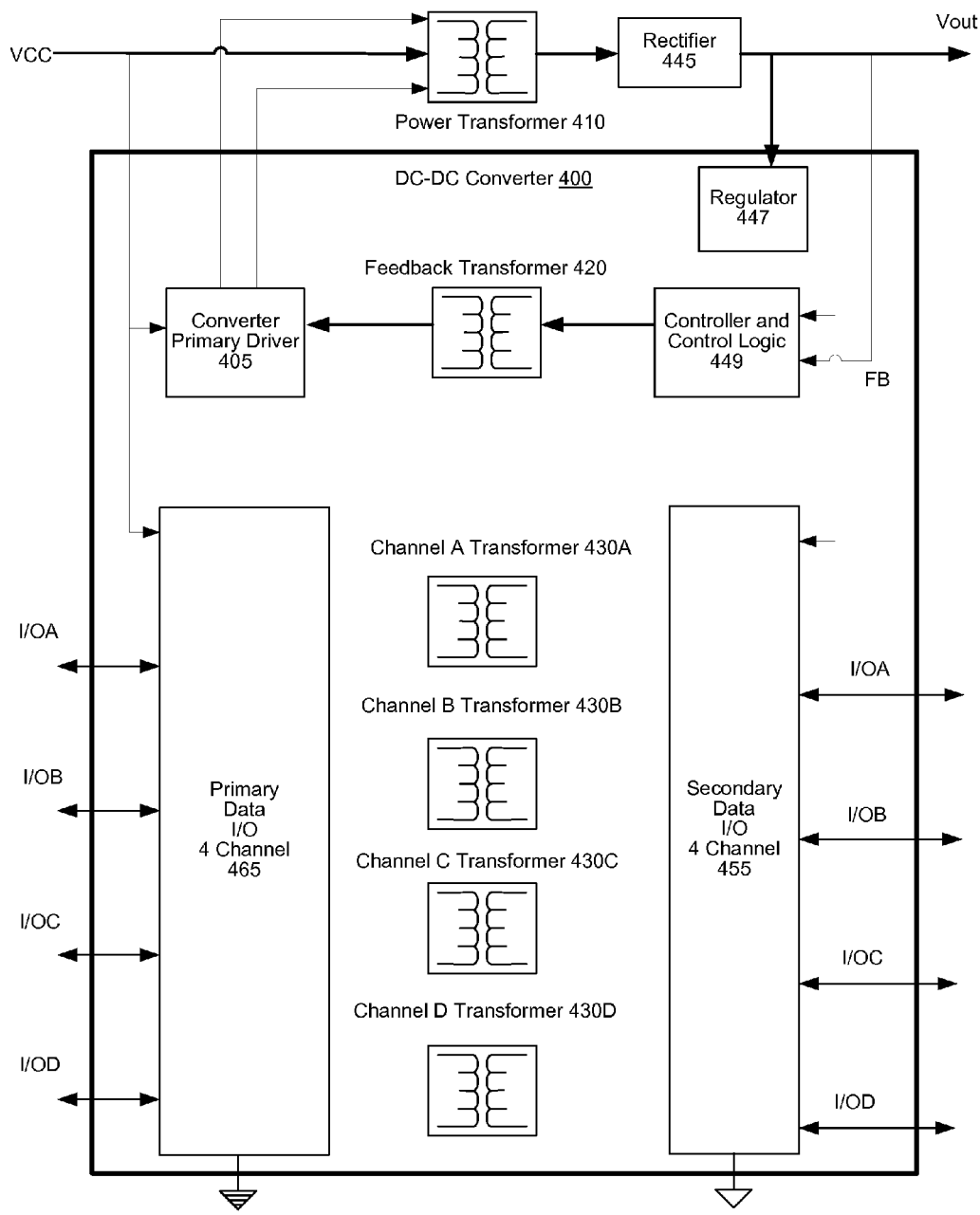
FIG. 4 illustrates an alternative implementation of a DC-DC converter in which the power transformer is shown implemented off chip.

FIG. 4 illustrates an alternative exemplary implementation of a DC-DC converter in which the power transformer is shown implemented off chip according to an embodiment of the present invention. For example, a power transformer 410, and a rectifier 445 may be located off chip. The components of the exemplary DC-DC converter 400 may include a regulator 447, a controller and control logic 449, a feedback transformer 420, secondary data input/output (I/O) 455, channel transformers 430A-430D, primary data I/O 465, and converter primary driver 405. The power supply voltage VCC may be provided to the power transformer 410 and as inputs to converter primary drivers 405. The DC-DC converter 400 may have inputs for power from VCC and from rectifier 445 and the secondary side of power transformer 410.

The DC-DC converter 400 may operate as explained above with respect to FIGS. 1 and 2. Functions of some circuits shown in FIGS. 1 and 2 may have been combined in components of FIG. 4. For example, the converter primary driver 405 of on-chip DC-DC converter 400 may include a soft start circuit, an activity detector, routing logic, and power switches as described with reference to FIGS. 1 and 2. In addition, the regulator 447 may include components that may be formed on chip, and may only supply voltages to the controller. The controller and control logic 449 may provide the control functions as described with reference to the controller of FIGS. 1 and 2. Similarly, the regulation functions may also be performed by the controller and control logic 449. Other embodiments may include configurations where only portions of the components are formed on a single integrated chip. The present embodiment may provide the advantage of leaving high voltage components off of the integrated circuit chip, and also allowing more chip real estate for inclusion of, for example, additional data channels.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

We claim:
1. An isolated DC-DC converter comprising:
an unpowered domain including a feedback control circuit configured to generate a feedback signal;
a powered domain, electrically isolated from the unpowered domain, including a soft start circuit configured to generate a soft start signal that gradually increases in amplitude, wherein the powered domain is configured to provide a drive signal to the unpowered domain and receive the feedback signal;
a first transformer configured to provide the drive signal to the unpowered domain;
a second transformer configured to provide the feedback signal to the powered domain; and
a switching control circuit in the powered domain, configured to receive the feedback signal and to provide an activity control signal that selects the soft start signal or the feedback signal, wherein the switching control circuit is configured to:
detect a voltage of the unpowered domain from the feedback signal,
determine if the voltage of the unpowered domain is less than a reference voltage,
responsive to the voltage of the unpowered domain being less than the reference voltage, select the soft start signal, and
responsive to the voltage of the unpowered domain being at or greater than the reference voltage, select the feedback signal.

2. The isolated DC-DC converter of claim 1, wherein:
the soft start circuit is configured, during start-up of the isolated DC-DC converter, to apply the soft start signal as the drive signal to the first transformer, and
the feedback control circuit is configured to regulate an output voltage in the unpowered domain at a stable level.

3. The isolated DC-DC converter of claim 1, wherein the first transformer is in a forward signal path from the powered domain to the unpowered domain, and the second transformer is in a feedback signal path from the unpowered domain to the powered domain.

4. The isolated DC-DC converter of claim 1, wherein the powered domain comprises a driving amplifier configured to route the soft start signal to be a source for the drive signal.

5. The isolated DC-DC converter of claim 1, wherein the powered domain comprises a driving amplifier configured to route the feedback signal or a signal based on the feedback signal to be a source for the drive signal.

6. The isolated DC-DC converter of claim 2, wherein the switching control circuit comprises an activity detector configured to detect the voltage of the unpowered domain.

7. The isolated DC-DC converter of claim 2, further comprising:
a blocking circuit, in the unpowered domain, configured to prevent the switching control circuit from selecting the feedback signal until the output voltage in the unpowered domain is at a target voltage within an operating limit.

8. The isolated DC-DC converter of claim 2, wherein the powered domain is configured to provide the drive signal based on the feedback signal.

9. The isolated DC-DC converter of claim 5, further comprising:
a control circuit in the powered domain, the control circuit including a routing logic configured to receive the activity control signal and, in response, alter the source for the drive signal.

10. The isolated DC-DC converter of claim 7, further comprising:
control logic, in the unpowered domain, responsive to an input from the blocking circuit and the feedback signal, configured to output the feedback signal to a primary winding of the second transformer.

11. The isolated DC-DC converter of claim 7, wherein the blocking circuit includes a comparator and a D flip-flop,
wherein the comparator is configured to send an output signal to the D flip-flop responsive to receiving the target voltage from the feedback control circuit in the unpowered domain and the output voltage in the unpowered domain, and
wherein the D flip-flop is configured to apply a signal to control logic in the unpowered domain that prevents the switching control circuit from selecting the feedback signal in response to an indication from the output signal that the voltage from the unpowered domain is not at the target voltage.

12. The isolated DC-DC converter of claim 8, wherein the feedback control circuit includes an error amplifier.

13. The isolated DC-DC converter of claim 8, wherein the selection of the soft start signal or the feedback signal is based on a pulse width modulation (PWM) of the feedback signal, wherein the PWM is based on a magnitude of the output voltage in the unpowered domain.

14. The isolated DC-DC converter of claim 9, wherein the control circuit in the powered domain includes a multiplexer, a S-R flip-flop, an OR gate, a T flip-flop, and dual NOR gates,
wherein an output of the multiplexer, responsive to input from each of the soft start circuit, the feedback control circuit, and the switching control circuit, is applied to both an input terminal of the S-R flip-flop and a first input of the OR gate,
wherein an output of the S-R flip-flop is applied to a second input of the OR gate, and
wherein an output of the OR gate is applied to both an input of the T flip-flop and an input of each of the dual NOR gates, a first output of the T-flip-flop is applied to a first gate of the dual NOR gates, and a second output of the T flip-flop is applied to a second gate of the dual NOR gates.

15. The isolated DC-DC converter of claim 12, wherein the feedback control circuit includes a comparator, the comparator receiving an alternating input signal from a waveform generator and an output from the error amplifier, and the comparator outputting the feedback signal.

16. An isolated DC-DC converter comprising:
a powered voltage domain comprising a primary winding of a first transformer, a secondary winding of a second transformer and a switching control circuit including an activity detector and a routing logic circuit;
an unpowered voltage domain comprising a secondary winding of the first transformer and a primary winding of the second transformer; and
an isolation barrier separating the powered voltage domain from the unpowered voltage domain,
wherein the first transformer is in a drive signal path from the powered voltage domain to the unpowered voltage domain,
wherein the second transformer is in a feedback signal path from the unpowered voltage domain to the powered voltage domain,
wherein the switching control circuit is configured to, during a transition of the DC-DC converter from a soft start operating mode to a feedback operating mode, determine whether a voltage in the unpowered voltage domain is within target operating limits of the unpowered voltage domain based on a feedback signal transferred through the second transformer from the unpowered voltage domain to the powered voltage domain,
wherein the activity detector is configured to control the routing logic circuit to continue the soft start operating mode in response to the switching control circuit determining that the voltage in the unpowered voltage domain is below a target operating limit, and
wherein the activity detector is configured to control the routing logic circuit to begin the feedback operating mode in response to the switching control circuit determining that the voltage in the unpowered voltage domain is within the target operating limits.

17. The isolated DC-DC converter of claim 16, the routing logic circuit comprising a multiplexer having inputs for signals from a soft start module and a feedback processor, wherein the multiplexer is controlled by a control signal from the activity detector, and wherein the feedback processor is configured to provide to the multiplexer a signal that drives the primary winding of the first transformer when the control signal from the activity detector indicates that the routing logic circuit is to begin the feedback operating mode.

18. The isolated DC-DC converter of claim 16, further comprising a control logic circuit in the unpowered voltage domain, wherein the activity detector is coupled to the secondary winding of the second transformer and configured to receive a signal based on a signal generated by the control logic circuit, the activity detector having an output coupled to an input of the routing logic circuit.

19. The isolated DC-DC converter of claim 16, further comprising a feedback controller, a blocking circuit, and a control logic circuit in the unpowered voltage domain, the control logic circuit comprising logic gates configured to allow signals from the feedback controller to pass to the primary winding of the second transformer based on an output from the blocking circuit.

20. The isolated DC-DC converter of claim 16, further comprising a soft start module configured to generate a soft start signal that induces a gradually increasing voltage in the unpowered voltage domain, the soft start signal being routed to the first transformer during the soft start operating mode.

21. The isolated DC-DC converter of claim 16, wherein the routing logic circuit, responsive to a control signal received from the activity detector indicating one of the soft start operating mode or the feedback operating mode, alters drive signals applied to the first transformer.

22. A method for soft starting a DC-DC converter, comprising:
    outputting, by a soft start circuit in a powered voltage domain, a soft start signal;
    providing the soft start signal to an unpowered voltage domain that is electrically isolated from the powered voltage domain so that a voltage is induced in the unpowered voltage domain;
    gradually increasing a duty cycle of the soft start signal;
    generating, by a feedback control circuit in the unpowered voltage domain and based on the induced voltage, a feedback signal;
    providing the feedback signal to the powered voltage domain via a feedback transformer;
    detecting by an activity detector circuit, in the powered voltage domain, the feedback signal from a secondary side of the feedback transformer; and
    in response to detecting the feedback signal, outputting, by the activity detector circuit, an activity control signal that stops the providing of the soft start signal.

23. The method of claim 22, further comprising passing, by a routing logic circuit in the powered voltage domain based on the activity control signal, the feedback signal to a power transformer.

24. The method of claim 22, further comprising:
    comparing the induced voltage in the unpowered voltage domain to a reference signal by a blocking circuit in the unpowered voltage domain,
    wherein the blocking circuit, based on a result of the comparison, either disables or enables application of the feedback signal to a primary side of the feedback transformer.

25. The method for soft starting a DC-DC converter of claim 22, further comprising:
    selecting, in the powered voltage domain, a drive signal to be supplied to the unpowered voltage domain, the drive signal being the soft start signal or a signal based on the feedback signal, wherein selecting, in the powered voltage domain, the drive signal to be supplied to the unpowered voltage domain is performed based on the provided feedback signal.

26. The method of claim 24, further comprising using the blocking circuit to:
    disable application of the feedback signal when the soft start signal is initially output, and
    enable application of the feedback signal only when the induced voltage in the unpowered voltage domain is within a threshold of the reference signal, by sending from the blocking circuit an output signal indicating that the induced voltage in the unpowered voltage domain is within the threshold of the reference signal.

27. The method for soft starting a DC-DC converter of claim 25, wherein the selecting of the drive signal is based on a pulse width modulation (PWM) of the feedback signal, wherein the PWM is based on a magnitude of an output voltage in the unpowered voltage domain.

28. The method of claim 26, further comprising using a control logic circuit in the unpowered voltage domain to apply, in response to the output signal from the blocking circuit, one of a modulated form of the feedback signal or the feedback signal to the primary side of the feedback transformer.

29. A DC-DC converter on an integrated circuit chip, comprising:
    a powered voltage domain comprising a soft start circuit; and
    an unpowered voltage domain comprising a feedback controller,
    wherein the soft start circuit is configured to for supply a gradually increasing soft start signal in the powered voltage domain, the soft start signal being induced as a voltage in the unpowered voltage domain;
    wherein the feedback controller is configured to regulate an output voltage of the unpowered voltage domain by measuring the induced voltage and generating a feedback signal that is transferred to the powered voltage domain, and
    wherein a drive signal supplied to the unpowered voltage domain is selected in the powered voltage domain based on the feedback signal.

30. The on-chip DC-DC converter of claim 29, further comprising:
    a power transformer having first and second windings;
    a converter driver comprising a switching control circuit in the powered voltage domain and coupled to the first winding of the power transformer, the converter driver configured to apply, during start up, the gradually increasing soft start signal as the signal to the first winding of the power transformer;
    a feedback transformer configured to transfer the feedback signal from the unpowered voltage domain to the powered voltage domain, the feedback transformer having a first winding coupled to an output of the feedback controller and a second winding coupled to the switching control circuit;
    wherein the switching control circuit in the powered voltage domain is configured to;
    control the drive signal supplied to the first winding of the power transformer, and,
    in response to a signal generated by the feedback controller, determine whether the drive signal remains the gradually increasing soft start signal or switches to a signal based on the feedback signal, and wherein the feedback signal provides an indication of a value of the output voltage in the unpowered voltage domain.

31. The on-chip DC-DC converter of claim 30, the converter driver further comprising:
an activity detector in the switching control circuit configured to detect a signal received from the second winding of the feedback transformer and determine whether the output voltage is within a threshold voltage for the DC-DC converter; and
a feedback processor in the powered voltage domain configured to provide the drive signal for driving the power transformer.

32. The on-chip DC-DC converter of claim 30, further comprising:
a blocking circuit in the unpowered voltage domain configured to prevent the feedback signal generated by the feedback controller from being applied to the first winding of the feedback transformer.

33. The on-chip DC-DC converter of claim 30, wherein the converter driver is on chip, wherein the power transformer is off chip and has terminals for its first and second windings to connect to the converter driver and an on-chip converter rectifier.

34. An isolated DC-DC converter comprising:
a powered voltage domain comprising a primary winding of a first transformer, a secondary winding of a second transformer, and a switching control circuit; and
an unpowered voltage domain comprising a secondary winding of the first transformer and a primary winding of the second transformer,
wherein the switching control circuit is configured to, during a transition of the DC-DC converter from a soft start operating mode to a feedback operating mode, determine whether a voltage in the unpowered voltage domain is within target operating limits of the unpowered voltage domain, wherein the switching control circuit, responsive to a feedback signal transferred through the second transformer, is configured to indicate a relationship between the voltage in the unpowered voltage domain and the target operating limits, and control a mode to be one of the soft start operating mode or the feedback operating mode.

35. The isolated DC-DC converter of claim 34, further comprising an isolation barrier separating the powered voltage domain from the unpowered voltage domain.

36. The isolated DC-DC converter of claim 34, wherein the first transformer is in a drive signal path from the powered voltage domain to the unpowered voltage domain, and the second transformer is in a feedback signal path from the unpowered voltage domain to the powered voltage domain, wherein the switching control circuit includes an activity detector and a routing logic circuit.

37. The isolated DC-DC converter of claim 34, wherein the switching control circuit is configured to control the mode to be the soft start operating mode when the voltage in the unpowered voltage domain is below a target operating limit and to be the feedback operating mode when the unpowered voltage domain is within the target operating limits.

* * * * *

UNITED STATES PATENT AND TRADEMARK OFFICE
CERTIFICATE OF CORRECTION

PATENT NO. : 9,948,175 B2
APPLICATION NO. : 13/101559
DATED : April 17, 2018
INVENTOR(S) : Tianting Zhao et al.

It is certified that error appears in the above-identified patent and that said Letters Patent is hereby corrected as shown below:

In Claim 29, at Column 12, Line 35 delete "wherein the soft start circuit is configured to for supply a" and replace it with --wherein the soft start circuit is configured to supply a--.

Signed and Sealed this
Twenty-sixth Day of June, 2018

Andrei Iancu
*Director of the United States Patent and Trademark Office*